UNITED STATES PATENT OFFICE.

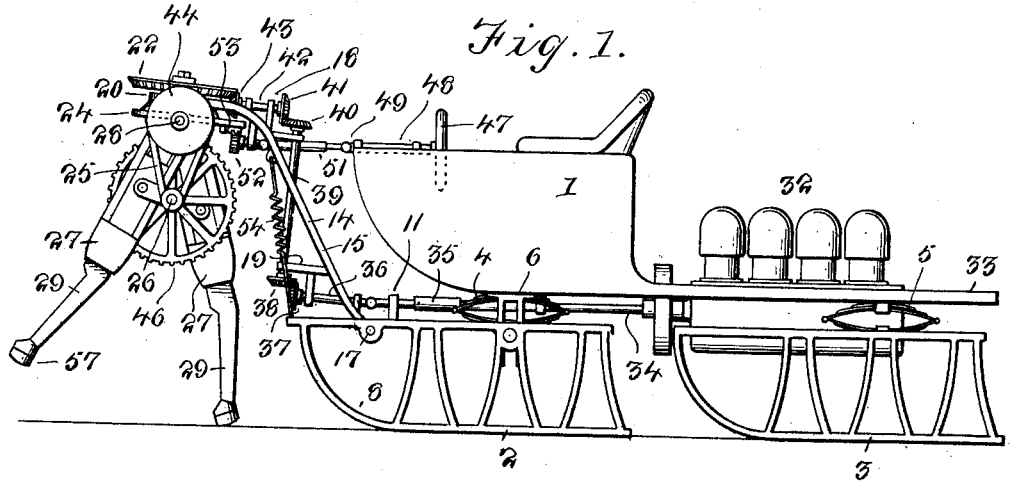

THOMAS D. WOOLSON, OF RICHMOND, VIRGINIA.

SLED-PROPELLING MECHANISM.

1,100,643.  Specification of Letters Patent.  Patented June 16, 1914.

Application filed February 7, 1914. Serial No. 817,309.

*To all whom it may concern:*

Be it known that I, THOMAS D. WOOLSON, a citizen of the United States, residing at Richmond, in the county of Henrico and State of Virginia, have invented new and useful Improvements in Sled-Propelling Mechanism, of which the following is a specification.

This invention relates to sled propelling mechanism, the object in view being to provide in combination with a sled, novel and effective sled propelling mechanism driven by a motor mounted on the sled, combined with means for varying the angle between the sled and the propelling means whereby the sled as a whole may be steered to one side or the other.

With the above and other objects in view, the invention consists in the novel construction, combination and arrangement of parts, as will hereinafter be more fully described, illustrated and claimed.

Figure 3:
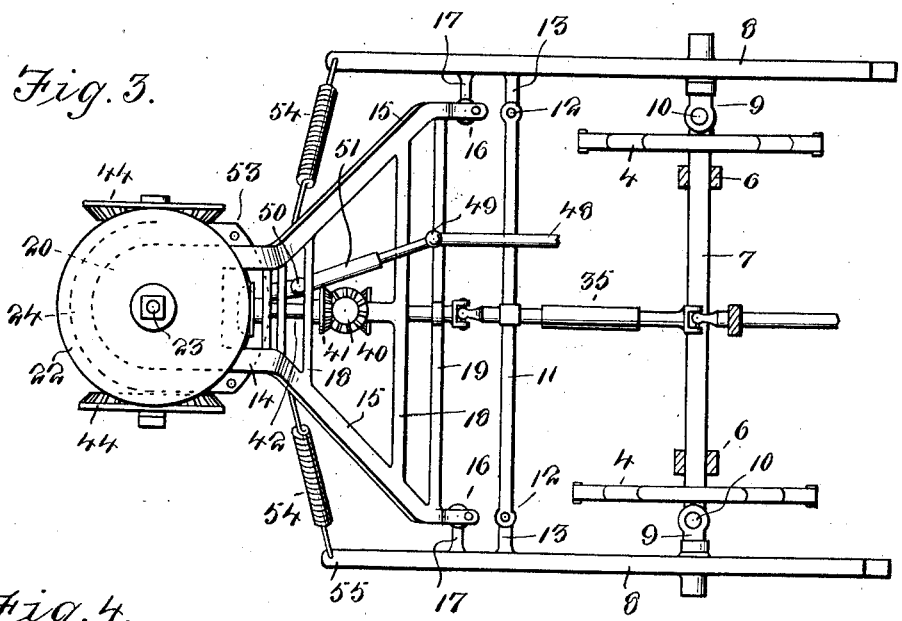
Figure 4:
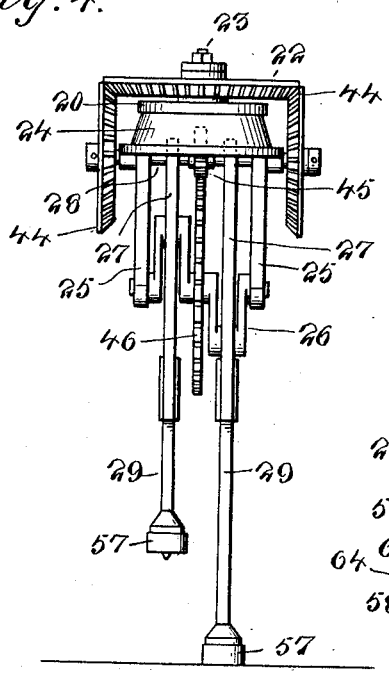
Figure 5:
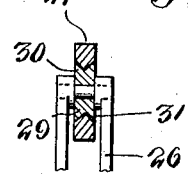
Figure 6:
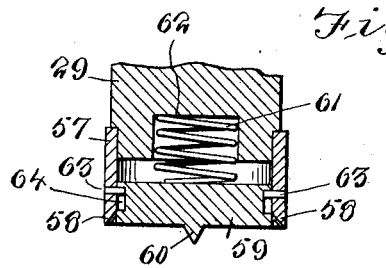

In the accompanying drawings:—Figure 1 is a side elevation of a sled showing the propelling means of this invention applied thereto. Fig. 2 is an enlarged vertical longitudinal section through the forward portion of the same. Fig. 3 is a plan view of the parts shown in Fig. 2. Fig. 4 is a front elevation of the propelling mechanism. Fig. 5 is a detail horizontal section through one of the oscillatory guides and traction elements, showing also a portion of the crank shaft. Fig. 6 is an enlarged detail vertical section through the lower end of one of the traction elements, showing the shoe cleaning plunger.

In the preferred embodiment of this invention I have illustrated the sleigh as comprising a body 1 mounted upon a pair of bob-sleds 2 and 3 arranged one in advance of the other, the body 1 being supported on the bob-sleds 2 and 3 by means of elliptic springs 4 and 5, the body 1 being provided at opposite sides with downwardly extending slotted guides 6 which straddle the axle 7, the latter extending across and connecting the opposite side runners of the forward bob-sled 2 as shown in Fig. 3. The side runners 8 of the forward bob-sled 2 are journaled on knuckles 9 so that said runners 8 may rock in a fore and aft direction and the said knuckles 9 are connected to the opposite ends of the axle 8 by means of vertical pivots or journals 10 which allow the runners 8 to rock laterally, said runners being, however, always maintained in parallel relation to each other by means of a stay bar 11 parallel to the axle 7 and pivotally connected at its opposite ends as shown at 12 to arms 13 extending inwardly from the runners 8 all as shown in Fig. 3. This pivotal and universal mounting of the runners 8 admits of the steering of the machine in connection with the propelling mechanism as will hereinafter appear.

Connected to the forward portion of the front bob-sled 2 is a thill frame 14 embodying the rearwardly diverging thill arms 15 which are connected by universal joints at 16 to inwardly extending projections or arms 17 on the runners 8. The thill arms 15 are connected by a plurality of cross braces 18 and 19. The forward portion of the thill frame terminates in a head plate 20 having an upwardly extending sleeve bearing 21 around which is journaled a bevel gear wheel 22. A king bolt 23 extends through the sleeve 21 and wheel 22 and also through the head plate 20 and an inverted dished crown plate 24, thus enabling the crown plate 24 to be turned around the bolt 23 as a center. Extending downwardly from opposite sides of the crown plate 24 are fork arms 25 in the lower ends of which is journaled a crank shaft 26 the purpose of which will appear.

27 designates a pair of oscillatory guides, said guides being arranged in parallel relation to each other as shown in Fig. 4 and pivotally mounted at their upper ends on a cross shaft 28 upon which said guides swing as a center when actuated by the crank shaft 26 above referred to. Mounted slidingly in said oscillatory guides 27 are traction elements 29, the sliding relation between the members 27 and 29 being illustrated in detail in Fig. 5 wherein it will be observed that each of the traction elements 29 has its opposite edges grooved as shown at 30 while the oscillatory guides are provided with V-shaped faces 31 along which the traction elements 29 slide in the direction of their length. The traction elements 29 are journaled on the crank pins of the crank shaft 26 and therefore when said shaft 26 is revolved, the traction elements 29 are caused to slide lengthwise of the oscillatory guides 27 and at the same time said guides are oscillated in a fore and aft direction.

The mechanism for driving the traction elements 29 consists of an internal combustion engine 32 mounted on the platform or floor 33 of the body 1 as shown in Fig. 1 and preferably over the rear bob-sled 3. The shaft 34 of the engine 32 is connected by a slide joint 35 to a tumbling shaft 36 having at its forward end a bevel gear wheel 37 which meshes with a corresponding bevel gear wheel 38 on the lower extremity of an upright shaft 39 connected by gears 40 and 41 to a forwardly extending shaft 42 provided at its forward extremity with a bevel pinion 43 which meshes with the bevel gear wheel 22 above referred to. Bevel gear wheels 44 are arranged at opposite sides of the gear wheel 22, both of said wheels being in mesh with the wheel 22 and one of said wheels 44 being fast on the shaft 28 above referred to. Fast on this same shaft 28 is a spur gear pinion 45 which meshes with and drives a large spur gear wheel 46 fast on the crank shaft 26. Therefore the power derived from the motor 32 is imparted to the crank shaft 26 which serves to drive the traction elements 29 in the manner above described.

The means for steering the machine comprises a hand controlled wheel 47 on the rear end of a forwardly extending steering shaft 48. This shaft is provided at suitable points with universal joints 49 and 50 and also with a slide joint 51 and at its forward extremity said shaft is provided with a pinion 52 which meshes with a rack face 53 on the under side of the dished crown plate 24 as shown in Figs. 1 and 2. Therefore, by turning the wheel 47 in either direction, the entire propelling mechanism may be turned in a corresponding direction for the purpose of steering the machine.

Contractile springs 54 are connected at their lower extremities to the forward ends of the runners 8 at the points 55 and are connected at their upper extremities at 56 to the rearwardly diverging thill arms 15 as shown. These springs serve to yieldingly depress or hold down the propelling mechanism so as to insure the proper engagement thereof with the surface over which the sled is traveling.

Each of the traction elements 29 is provided at its lower extremity with an arcuate shoe 57 having a cutting edge 58 which edge is preferably rounded in a fore and aft direction as shown in Figs. 1 and 2 so as to rock in contact with the supporting surface. Within the shoe 57 is mounted a vertically movable shoe cleaning plunger 59 having on the bottom or working face thereof one or more barbs 60 to obtain a firm hold on the supporting surface. The plunger 59 is normally held down by means of a coiled expansion spring 61 arranged in a recess 62 in the bottom of the traction element 29 as shown in the detail section Fig. 6. Stop pins 63 extending inwardly from the shoe 57 and entering grooves 64 in the plunger 59 serve to limit the upward and downward movements of the plunger 59, permitting said plunger to move to a position flush with the lower edge of the shoe 57 so as to free the bottom end of the traction element 29 from any snow, ice or the like which may adhere thereto.

From the foregoing description it will now be seen that the traction elements are driven by the engine carried by the sled and by means of the construction particularly set forth, said traction elements receive a fore and aft oscillatory movement and also have an upward and downward sliding movement. This causes the bottom ends of the traction elements to describe elliptical paths resembling closely the movements of the hoof of a draft animal, the shoes 57 moving clear of the ground or supporting surface as they travel in a forward direction, and working in contact with the supporting surface when moving rearwardly. The springs 54 allow the propelling mechanism as a whole to rise and fall in accordance with the movements and operation of the traction elements 29 and prevent any disagreeable jars from being imparted to the sleigh body while keeping the traction elements in proper working relation to the supporting surface.

What I claim is:—

1. The combination with a sled, of propelling mechanism comprising a thill frame having a jointed connection with the sled, a plurality of oscillatory guides pivotally attached to said thill frame, traction elements slidably mounted on said guides, a motor, and motor-driven connections operating to oscillate said guides and simultaneously slide said traction elements.

2. The combination with a sled the runners of which are connected to admit of their relative movement in a fore and aft direction, of propelling mechanism comprising a thill frame having a jointed universal connection with the sled, a plurality of oscillatory guides pivotally attached to said thill frame, traction elements slidably mounted on said guides, a motor, and motor-driven connections operating to oscillate said guides and simultaneously slide said traction elements.

3. The combination with a sled, of propelling mechanism comprising a thill frame having a jointed connection with the sled, a plurality of oscillatory guides pivotally attached to said thill frame, traction elements slidably mounted on said guides, a motor, a crank shaft journaled in said thill frame and serving to oscillate said guides and impart a sliding movement to said traction elements, and driving connections between said motor and crank shaft.

4. The combination with a sled, of propelling mechanism comprising a thill frame having a jointed connection with the sled, a plurality of oscillatory guides pivotally attached to said thill frame, traction elements slidably mounted on said guides, a motor, motor-driven connections operating to oscillate said guides and simultaneously slide said traction elements, and means for yieldingly depressing said thill frame.

5. The combination with a sled, of propelling mechanism comprising a thill frame having a jointed connection with the sled, a plurality of oscillatory guides pivotally attached to said thill frame, traction elements slidably mounted on said guides, a motor, motor-driven connections operating to oscillate said guides and simultaneously slide said traction elements, and means for swinging said thill frame laterally to steer the sled by means of the propelling mechanism.

6. The combination with a sled, of propelling mechanism comprising a thill frame having a jointed connection with the sled, a plurality of oscillatory guides pivotally attached to said thill frame, traction elements slidably mounted on said guides, traction shoes on said traction elements, shoe-cleaning plungers carried by said traction elements, a motor, and motor-driven connections operating to oscillate said guides and simultaneously slide said traction elements.

In testimony whereof I affix my signature in presence of two witnesses.

THOMAS D. WOOLSON.

Witnesses:
J. A. PURDIE, Jr.,
B. D. PURDIE.

Copies of this patent may be obtained for five cents each, by addressing the "Commissioner of Patents, Washington, D. C."